United States Patent
Singh et al.

(10) Patent No.: US 12,499,236 B2
(45) Date of Patent: Dec. 16, 2025

(54) MANAGEMENT OF SELF-SIGNED CERTIFICATES FOR SECURE BOOT OF VIRTUAL MACHINES

(71) Applicant: DELL PRODUCTS L.P., Round Rock, TX (US)

(72) Inventors: Ankit Singh, Bangalore (IN); Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 18/182,490

(22) Filed: Mar. 13, 2023

(65) Prior Publication Data

US 2024/0311488 A1 Sep. 19, 2024

(51) Int. Cl.
*G06F 9/455* (2018.01)
*G06F 21/57* (2013.01)

(52) U.S. Cl.
CPC ........ *G06F 21/575* (2013.01); *G06F 9/45558* (2013.01); *G06F 2009/45562* (2013.01); *G06F 2009/45587* (2013.01)

(58) Field of Classification Search
CPC .............. G06F 21/575; G06F 9/45558; G06F 2009/45562; G06F 2009/45587
See application file for complete search history.

(56) References Cited

U.S. PATENT DOCUMENTS

| | | | | |
|---|---|---|---|---|
| 8,949,825 B1* | 2/2015 | Fitzgerald | ........... | G06F 9/45537 718/1 |
| 9,191,454 B2* | 11/2015 | Fries | ........... | H04L 67/59 |
| 9,305,147 B1* | 4/2016 | Azmat | ........... | G06F 21/121 |
| 10,482,257 B2 | 11/2019 | Suryanarayana et al. | | |
| 10,489,594 B2 | 11/2019 | Suryanarayana et al. | | |
| 2005/0069138 A1* | 3/2005 | de Jong | ........... | G06F 9/3017 380/278 |
| 2008/0098465 A1* | 4/2008 | Ramakrishna | ........... | G06F 21/10 726/5 |
| 2009/0300599 A1* | 12/2009 | Piotrowski | ........... | G06F 9/45558 718/1 |
| 2015/0256341 A1* | 9/2015 | Ye | ........... | H04L 9/321 713/164 |
| 2015/0264026 A1* | 9/2015 | Firth | ........... | H04L 63/08 726/4 |
| 2015/0271297 A1* | 9/2015 | Zimmer | ........... | H04L 1/0041 709/203 |

(Continued)

*Primary Examiner* — Danny Chan
(74) *Attorney, Agent, or Firm* — Larson Newman, LLP

(57) ABSTRACT

An information handling system may initiate a secure boot process in response to a launch of a new virtual machine, and assign an identifier to the new virtual machine. In response to determining that the new virtual machine is to be associated with an authorized certificates database and an unauthorized certificates database, the system may compile a list of certificates for the new virtual machine. In response to determining that a first certificate from the list of certificates is to be included in the authorized certificates database, the system adds the first certificate to the authorized certificates database. In response to determining that a second certificate from the list of certificates is to be included in the unauthorized certificates database, the system adds the second certificate to the unauthorized certificates database.

20 Claims, 4 Drawing Sheets

(56) References Cited

U.S. PATENT DOCUMENTS

| | | | |
|---|---|---|---|
| 2016/0050112 A1* | 2/2016 | Crowe | G06F 3/0655 |
| | | | 709/221 |
| 2017/0003993 A1* | 1/2017 | Zhou | G06F 9/45558 |
| 2018/0365045 A1* | 12/2018 | Hakala | G06F 21/575 |
| 2019/0012271 A1* | 1/2019 | Avoinne | G06F 12/145 |
| 2019/0114427 A1 | 4/2019 | Suryanarayana et al. | |
| 2020/0285483 A1* | 9/2020 | Callaghan | G06F 21/575 |
| 2020/0320201 A1* | 10/2020 | Robinson | G06F 21/64 |
| 2021/0279302 A1* | 9/2021 | Ya | G06F 21/105 |
| 2022/0100862 A1* | 3/2022 | Vetter | G06F 21/575 |
| 2022/0156362 A1* | 5/2022 | Takahashi | G06F 9/45558 |
| 2023/0205866 A1* | 6/2023 | Gunn | H04L 9/0863 |
| | | | 726/2 |

* cited by examiner

MANAGEMENT OF SELF-SIGNED CERTIFICATES FOR SECURE BOOT OF VIRTUAL MACHINES

FIELD OF THE DISCLOSURE

The present disclosure generally relates to information handling systems, and more particularly relates to the management of self-signed certificates used for a secure boot of virtual machines.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may initiate a secure boot process in response to a launch of a new virtual machine, and assign an identifier to the new virtual machine. In response to determining that the new virtual machine is to be associated with an authorized certificates database and an unauthorized certificates database, the system may compile a list of certificates for the new virtual machine. In response to determining that a first certificate from the list of certificates is to be included in the authorized certificates database, the system adds the first certificate to the authorized certificates database. In response to determining that a second certificate from the list of certificates is to be included in the unauthorized certificates database, the system adds the second certificate to the unauthorized certificates database.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
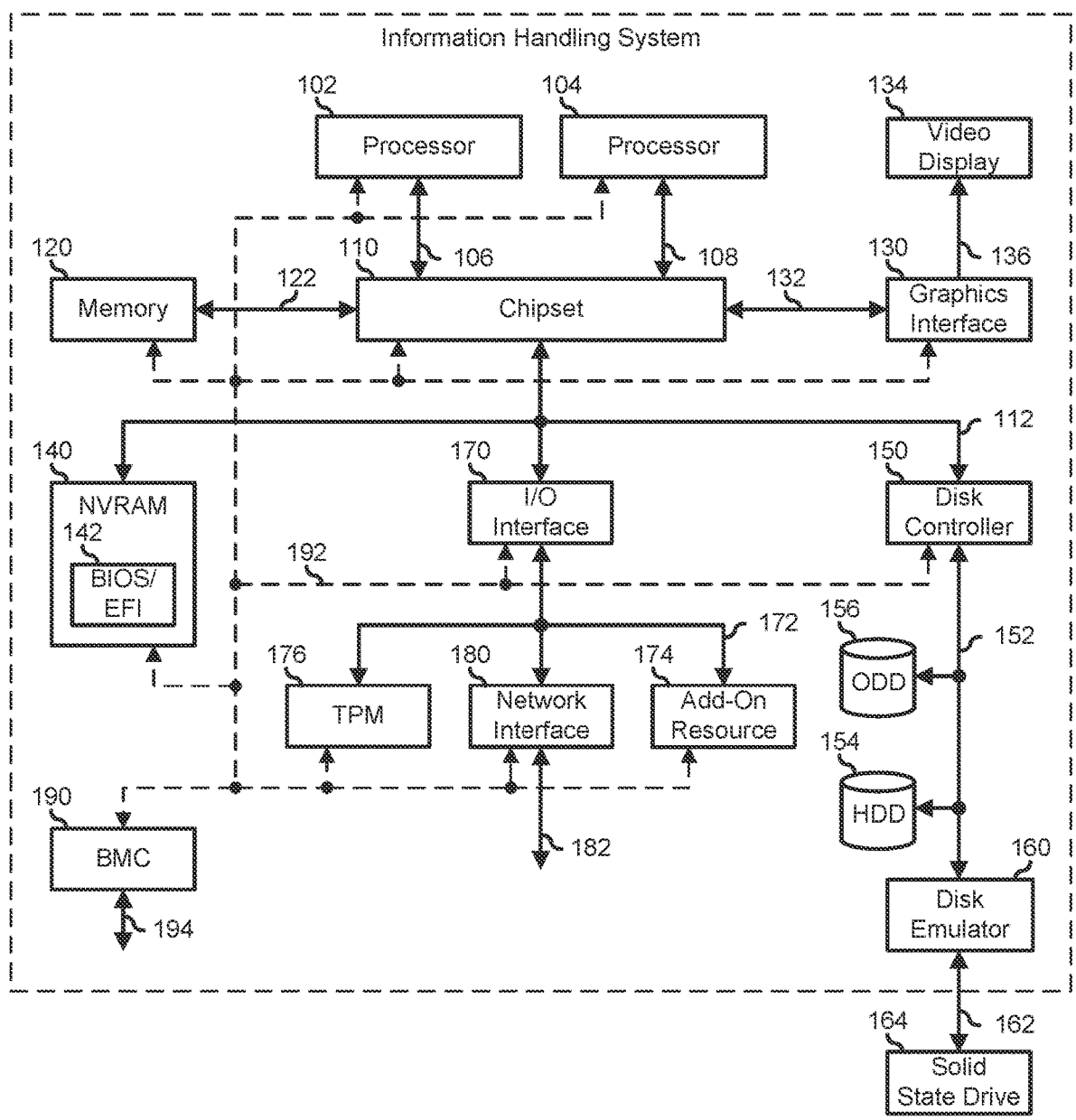
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/ extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A unified extensible firmware interface (UEFI) secure boot is a standard that helps ensure that an information handling system boots using only software that is trusted by the manufacturer via a platform key signed by the manufacturer. In a cloud-based environment where virtual machines are owned by different companies, the platform owner using the platform key has to sign a key exchange key (KEK) for each company so that these companies can add their certificates in an authorized and/or unauthorized certificates database. Accordingly, each of these companies typically approaches the platform owner to sign the KEK with the platform key.

Thus, the root signature will always be shown as the platform owner even though the virtual machines belong to these companies. This is done even though each virtual machine may have different requirements for certification verification because there is currently no solution wherein each virtual machine can have its own customized certificate database. For example, a certificate may be whitelisted for a first virtual machine but is blacklisted for a second virtual machine. Accordingly, the certificate may be stored in both the authorized certificates database and the unauthorized certificates database which blocks the first virtual machine from executing applications signed with the certificate.

For example, a certificate that is in a whitelist for a first virtual machine should be in a blacklist for a second virtual machine. Accordingly, the certificate may be stored in a blacklist database. However because the certificate is on the blacklist, the first virtual machine may still block applications signed with the certificate. To address these and other concerns, the present disclosure provides a system and method for the management of self-signed certificates used for the secure boot of virtual machines.

Figure 2:
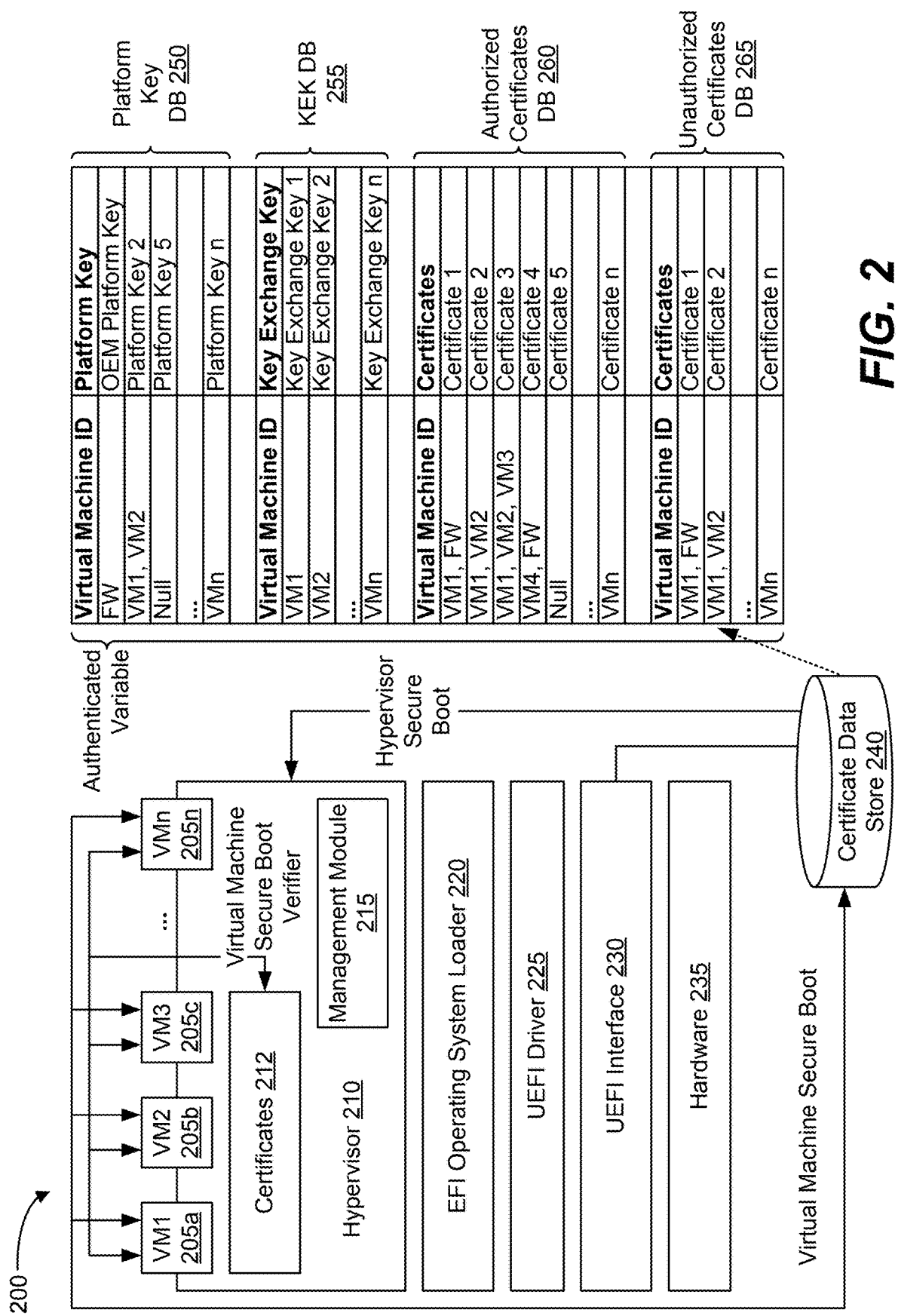
FIG. 2 is a block diagram illustrating a system for the management of self-signed certificates for a secure boot of virtual machines, according to an embodiment of the present disclosure.

FIG. 2 illustrates a system 200 for the management of self-signed certificates used for a secure boot of virtual machines. System 200 includes a hypervisor 210, an EFI operating system loader 220, a UEFI driver, a UEFI interface 230, a hardware 235, and a certificate data store 240. Hypervisor 210 includes certificates 212, and a management module 215. In addition, hypervisor 210 hosts virtual machines 205*a*-205*n*. Further, hypervisor 210 provides a software layer between hardware 235 and guest operating systems in virtual machines 205*a*-205*n*. In various embodiments, system 200 may not include each of the components shown in FIG. 2. Additionally, or alternatively, system 200 may include various additional components in addition to those that are shown in FIG. 2. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip. System 200 may be implemented as a single server or a plurality of virtual or physical servers which may or may not be geographically co-located. For example, system 200 and/or other aspects of system 200 may be hosted in a cloud-based hosting service.

Hypervisor 210 may include software and/or firmware generally operable to allow multiple operating systems to run on a single information handling system at the same time. This operability is generally allowed via virtualization, a technique for hiding the physical characteristics of information handling system resources from how other systems, applications, or end users interact with those resources. Hypervisor 210 may be one of a variety of proprietary and/or commercially available virtualization platforms, including, but not limited to IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK'S VIRTUALBOX, etc. In one embodiment, hypervisor 210 may include a specially designed operating system with native virtualization capabilities. In another embodiment, hypervisor 210 may include a standard operating system with an incorporated virtualization component. In yet another embodiment, hypervisor 210 may include a standard operating system with an incorporated virtualization component for performing virtualization. In another embodiment, hypervisor 210 may include a standard operating system running alongside a separate virtualization application.

The information handling system may enforce a secure boot protocol for booting virtual machines 205*a*-205*n*. The secure boot provides a mechanism for authenticating drivers and loaders that can be installed during boot initialization of an information handling system and virtual machines. The secure boot protocol is configured to prevent the loading of UEFI drivers, such as UEFI driver 225, and operating system loaders, such as EFI operating system loader 220, that are not signed by with an acceptable digital signature, such as from certificates 212.

UEFI interface 230 may provide a software interface between an operating system and the BIOS. UEFI interface 230 may also provide an interface with certificate data store 240. For example, UEFI interface 230 may be used to add, retrieve, and/or delete a certificate or key from certificate data store 240. In one embodiment, certificate data store 240 may be a non-volatile storage device that is tamper and delete-resistant. Certificate data store 240 may be used to store the keys and the certificates using a tabular format in certificate data store 240. For example, the keys and the certificates may be stored using one database table. In another example, each set of keys and the certificates may be stored in separate database tables. For example, the platform keys may be stored in a platform key database 250 while the KEKs may be stored in a KEK database 255. Authorized certificates may be stored in an authorized database 260 while unauthorized certificates may be stored in unauthorized certificates database 265. Each of the aforementioned databases may include a list, a table, a map, or other data structure of certificates and/or keys to validate signatures of firmware, drivers, or other executable code to be executed in connection with system 200 or virtual machines 205*a*-205*n*.

Each database table may include a first column for a virtual machine identifier and a second column for the certificate or the key. The virtual machine identifier may be a globally unique identifier used to identify each virtual machine. The identifier may be generated by a globally unique identifier generator when a new virtual machine is initially launched. Each key and certificate in certificate data store 240 may be associated with one or more virtual machines by mapping the certificate or the key to the identifier of one or more virtual machines. This identifier may be stored in the first column of the database. However, if the certificate or the key can be used by all of the virtual machines, then the first column may include a value to indicate accordingly. In this example, the first column associated with a value, such certificate or key may include the value "NULL" although any other unique identifier may be used. Another value for the unique identifier may be used to indicate that a platform key is an OEM platform key or the certificate or the key can be used to boot a host operating system, hypervisor 210, native firmware, or a new virtual machine. In this example, the value "FW" is used, although any other unique identifier may be utilized.

A certificate or key may be deleted from certificates data store 240 based on the virtual machine identifiers. If the certificate or key is associated with multiple virtual machines, then the certificate or key may not be deleted unless the deletion is based on all of the virtual machines the certificate or key is associated with. During a live migration of a virtual machine, such as virtual machine 205*a*, the certificates mapped to the identifier of the virtual machine may also be bundled and moved or migrated. Certificates mapped to multiple virtual machines, such as those mapped to virtual machines 205*a* and 205*b* or certificates mapped to all the virtual machines, such as the certificates that are mapped to the identifier NULL may also be bundled and moved or migrated. In addition, certificates and/or keys that are mapped to the OEM platform key or used to boot a host operating system, hypervisor 210, native firmware, or a new virtual machine may also be bundled and moved or migrated.

A platform key is used to establish a trust relationship between a platform owner and a firmware, such as UEFI driver 225, by controlling access to KEK database 255. The platform keys may be stored in platform key database 250 while KEK database 255 includes a list of keys that may be configured to establish a trust relationship between the firmware and the operating system. Authorized database 260 includes a list of certificates or public keys that may be used to check the digital signature of a given firmware or software, also referred to as a whitelist. Unauthorized certificates database 265 includes a list of certificates or public keys that are known to correspond to malicious or unauthorized firmware or software, also referred to as a blacklist.

In other words, authorized database 260 includes trusted certificates and/or keys while unauthorized certificates database 265 includes untrusted certificates and/or keys, such as those that have been revoked. In some embodiments, authorized database 260 may include a "DB" as defined in the UEFI while unauthorized certificates database 265 may include a "DBX" as defined in the UEFI.

Each one of virtual machines 205a-205n may be owned by a different company, referred to also as a vendor or a third party. For example, virtual machine 205a may be owned by company A while virtual machine 205b may be owned by company B, and so on. Each of the companies may add its platform key to platform key database 250, wherein the added platform key may also include an associated virtual machine identifier. By having their platform key in certificates data store 240, the companies can also add their KEK by signing through their platform keys. Accordingly, the root signature of the platform key may show the company instead of the platform owner or manufacturer.

If a virtual machine is customized for a particular company and wants a limited number of certificate and/or key verification processes. The company may also want its own set of certificates and/or keys. As each certificate or key is associated with the virtual machine, only certificates and keys associated with that virtual machine may be used during a secure boot of the virtual machine to determine whether to allow or disallow execution of an application at the virtual machine.

Each virtual machine is associated with a unique identifier. For example, VM1 is a unique identifier of virtual machine 205a while VM2 is a unique identifier of virtual machine 205b, and so forth. Management module 215 may be configured to maintain and manage these unique identifiers. When a certificate or key is requested from a firmware database, such as certificate data store 240, the unique identifier of the virtual machine may be transmitted with the request. Certificates and/or keys stored in certificate data store 240 may be queried based on the unique identifier of the virtual machine.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Throughout this disclosure, a hyphenated form of a reference numeral or alphabetical refers to a specific instance of an element and the un-hyphenated form of the reference numeral refers to the element generically. Thus, for example, virtual machine "205a" refers to an instance of a virtual machine class, which may be referred to collectively as virtual machines 205 and any one of which may be referred to generically as virtual machine 205.

Figure 3:
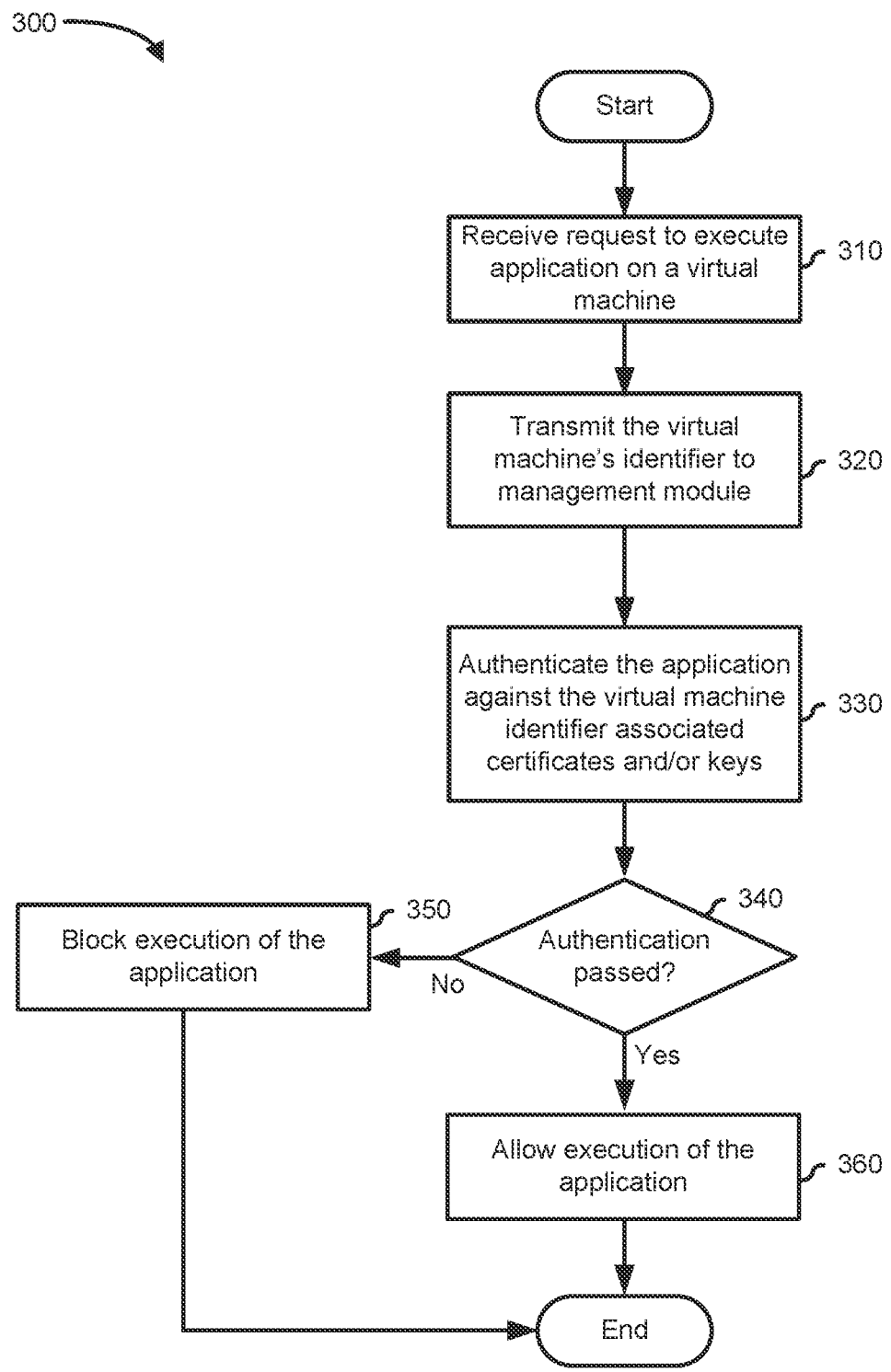
FIG. 3 is a flowchart illustrating a method for the management of self-signed certificates for a secure boot of virtual machines, according to an embodiment of the present disclosure.

FIG. 3 illustrates a method 300 for the management of self-signed certificates used for the secure boot of virtual machines. Method 300 may be performed by one or more components of system 200 of FIG. 2. However, while embodiments of the present disclosure are described in terms of 200 of FIG. 2, it should be recognized that other systems may be utilized to perform the described method. One of skill in the art will appreciate that this flowchart explains a typical example, which can be extended to advanced applications or services in practice.

Method 300 typically starts at block 310 where a request to execute an application on a virtual machine is received. The method proceeds to block 320 where the method may pass the virtual machine's identifier to a management module, such as management module 215 of FIG. 2. The management module may be configured to determine the certificate and/or keys associated with the virtual machine. The method may proceed to block 330.

At block 330, the method may authenticate the application against the certificate and/or keys associated with the virtual machine. The method may proceed to decision block 340 where the method may determine whether the authentication is successful or not. If the authentication is successful, then the "YES" branch is taken, and the method proceeds to block 360. If the authentication is not successful, then the "NO" branch is taken, and the method proceeds to block 350. At block 360, the method may allow the execution of the application. While the method may block the execution of the application at block 350.

Figure 4:
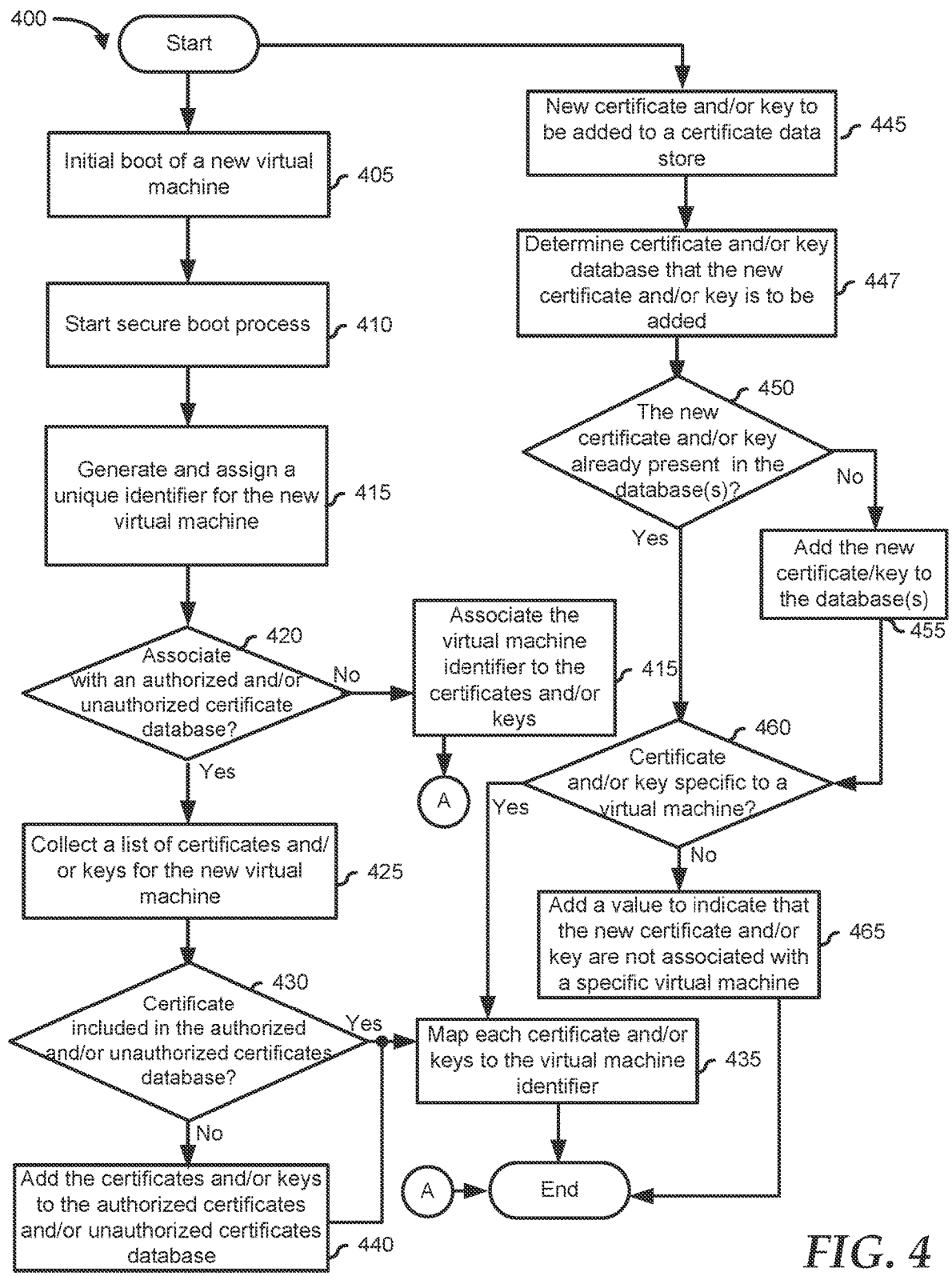
FIG. 4 is a flowchart illustrating a method for the management of self-signed certificates for a secure boot of virtual machines, according to an embodiment of the present disclosure.

FIG. 4 illustrates a method 400 for the management of self-signed certificates used for the secure boot of virtual machines. Method 400 may be performed by one or more components of system 200 of FIG. 2. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 400 typically starts at block 405 and block 445. At block 405, the method may launch or perform an initial boot of a new virtual machine. The method proceeds to block 410 where the method may initiate a secure boot process for the virtual machine. The method proceeds to block 415, where a unique identifier is assigned to the new virtual machine. The unique identifier may be generated and/or assigned by the management module. The method proceeds to decision block 420. At decision block 420, the method determines whether the new virtual machine may be required or desired to be associated with an authorized certificates database and/or an unauthorized certificates database. If the new virtual machine may be required or desired to be associated with the authorized certificates database or the unauthorized certificates database, then the "YES" branch is taken, and the method proceeds to block 425. If the new virtual machine may not be required or desired to be associated with the authorized certificates database or the unauthorized certificates, then the "NO" branch is taken, and the method proceeds to block 415.

At block 415, the method may associate the new virtual machine's identifier with the certificates and/or keys. Afterwards, the method ends. At block 425, the method may retrieve a list of certificates and/or keys for the new virtual machine. The method proceeds to decision block 430 where the method determines whether each one of the certificates and/or keys in the list are already in the authorized certificates database and/or the unauthorized certificates database. If each of the certificates and/or keys in the list are already included in the authorized certificates database or the unauthorized certificates database, then the "YES" branch is taken, and the method proceeds to block 435. If a certificate is not included in the authorized certificates database or the unauthorized certificates, then the "NO" branch is taken, and the method proceeds to block 440.

At block 435, the method may update the authorized certificates database and the unauthorized certificates database by mapping applicable certificates and/or keys to the virtual machine identifier. At block 440, the certificate is added to the authorized certificates database or the unauthorized certificates database. In addition, the added certificate and/or key may be mapped to the virtual machine identifier.

At block 445, a new certificate and/or key may be added to a certificate data store. The method proceeds to block 447 where the method determines which database or databases in the certificate data store that the certificate and/or key is to be added. For example, if the new certificate and/or key are a platform key, then the new certificate may be added to a platform key database. If the new certificate and/or key is a key exchange key, then the new certificate and/or key are added to a KEK database. The method may also determine whether the new certificate and/or key are to be added to an authorized certificates database and/or an unauthorized certificates database. In one embodiment, the determination may be performed by an administrator and assign the certificate and/or the key to a database. In another embodiment, the determination may be based on one or more rules or policies associated with the hypervisor and/or the management module.

The method proceeds to decision block 450 where the method determines whether the new certificate and/or key are already included in the database(s). If the new certificate and/or key are already included in the database(s), then the "YES" branch is taken, and the method proceeds to decision block 460. If the certificate is not yet included in the database(s), then the "NO" branch is taken, and the method proceeds to block 455.

At block 455, the method may add the certificate and/or the key to the database(s). At decision block 460, the method determines whether the certificate and/or key are specific to a virtual machine. If the certificate and/or key are specific to a virtual machine, then the "YES" branch is taken, and the method proceeds to block 435. If the certificate and/or key are not specific to a virtual machine, then the "NO" branch is taken, and the method proceeds to block 465. At block 465, the method may add a value in the database to indicate that the new certificate and/or key are not associated with a specific virtual machine. The value indicates that the certificate and/or key apply to the virtual machines hosted by the hypervisor. For example, the new certificate and/or keys may be mapped to the value "NULL". The method then ends.

Although FIG. 3, and FIG. 4 show example blocks of method 300 and method 400 in some implementations, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and method 400 may be performed in parallel. For example, blocks 410 and 415 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
  receiving, by a processor, a request to execute an application in a virtual machine, wherein the request includes an identifier associated with the virtual machine, and wherein the identifier is assigned to the virtual machine during an initial boot of the virtual machine;

transmitting the identifier associated with the virtual machine to a management module located in a hypervisor;

authenticating the application against a set of certificates associated with the identifier of the virtual machine, wherein the set of certificates were associated with the identifier during the initial boot of the virtual machine;

allowing the application to execute in the virtual machine in response to a successful authentication; and in response to determining that the virtual machine is not to be associated with a certificate of the set of certificates, adding a value to indicate that the identifier of the virtual machine is not associated with the certificate.

2. The method of claim 1, further comprising disallowing the application to execute in the virtual machine in response to an unsuccessful authentication.

3. The method of claim 1, wherein the management module maintains unique identifiers associated with virtual machines.

4. The method of claim 1, further comprising receiving another request from a vendor to add a platform key for the virtual machine.

5. The method of claim 4, further comprising adding the platform key based on the other request from the vendor, wherein the platform key includes the identifier of the virtual machine.

6. The method of claim 1, further comprising maintaining a certificate data store that includes keys and certificates, wherein each one of the keys and the certificates is mapped to a specific virtual machine using a unique identifier.

7. The method of claim 6, wherein the keys and the certificates are stored using a tabular format in the certificate data store.

8. The method of claim 1, further comprising authenticating the application during a secure boot of the virtual machine.

9. An information handling system, comprising:
a processor; and
a memory storing instructions that when executed cause the processor to perform operations including:
receiving a request to execute an application in a virtual machine, wherein the request includes an identifier associated with the virtual machine, and wherein the identifier is assigned to the virtual machine during an initial boot of the virtual machine;
transmitting the identifier associated with the virtual machine to a management module located in a hypervisor;
authenticating the application against a set of certificates associated with the identifier of the virtual machine, wherein the set of certificates were associated with the identifier during the initial boot of the virtual machine;
allowing the application to execute in the virtual machine in response to a successful authentication; and
in response to determining that the virtual machine is not to be associated with a certificate of the set of certificates, adding a value to indicate that the identifier of the virtual machine is not associated with the certificate.

10. The information handling system of claim 9, wherein the operations further comprise disallowing the application to execute in the virtual machine in response to an unsuccessful authentication.

11. The information handling system of claim 9, wherein the identifier of the virtual machine is associated with a platform key of an owner of the virtual machine.

12. The information handling system of claim 9, wherein the management module maintains unique identifiers associated with virtual machines.

13. The information handling system of claim 9, wherein the operations further comprise adding a platform key associated with a vendor to a certificate data store.

14. A non-transitory computer-readable medium to store instructions that are executable to perform operations comprising:
receiving a request to execute an application in a virtual machine, wherein the request includes an identifier associated with the virtual machine, and wherein the identifier is assigned to the virtual machine during an initial boot of the virtual machine;
transmitting the identifier associated with the virtual machine to a management module located in a hypervisor;
authenticating the application against a set of certificates associated with the identifier of the virtual machine, wherein the set of certificates were associated with the identifier during the initial boot of the virtual machine;
allowing the application to execute in the virtual machine in response to a successful authentication; and
in response to determining that the virtual machine is not to be associated with a certificate of the set of certificates, adding a value to indicate that the identifier of the virtual machine is not associated with the certificate.

15. The non-transitory computer-readable medium of claim 14, wherein the operations further comprise disallowing the application to execute in the virtual machine in response to an unsuccessful authentication.

16. The non-transitory computer-readable medium of claim 14, wherein the identifier of the virtual machine is associated with a platform key of an owner of the virtual machine.

17. The non-transitory computer-readable medium of claim 14, wherein the operations further comprise adding a platform key that is associated with the virtual machine to a certificate data store.

18. The non-transitory computer-readable medium of claim 14, wherein the operations further comprise adding a key exchange key associated with the virtual machine to a certificate data store.

19. The non-transitory computer-readable medium of claim 18, wherein keys and certificates are stored using a tabular format in the certificate data store.

20. The non-transitory computer-readable medium of claim 14, wherein the authenticating of the application is performed during a secure boot of the virtual machine.

* * * * *